US00RE36982E

United States Patent [19]

Melikyan et al.

[11] E Patent Number: Re. 36,982

[45] **Reissued Date of Patent: *Dec. 5, 2000**

[54] SURFACTANTS BASED AQUEOUS COMPOSITIONS WITH D-LIMONENE AND HYDROGEN PEROXIDE AND METHODS USING THE SAME

[75] Inventors: Arman V. Melikyan; Patrick H. Stewart, both of Danville, Ill.

[73] Assignee: Envirox, L.L.C., Georgetown, Ill.

[ * ] Notice: This patent is subject to a terminal disclaimer.

[21] Appl. No.: 09/248,406

[22] Filed: Feb. 11, 1999

Related U.S. Patent Documents

Reissue of:

[64] Patent No.: 5,602,090
Issued: Feb. 11, 1997
Appl. No.: 08/578,971
Filed: Dec. 27, 1995

[51] Int. Cl.[7] ..... C11D 1/831; C11D 3/39; C11D 3/44; C11D 17/08

[52] U.S. Cl. ..... 510/372; 8/111; 8/137; 134/2; 134/40; 134/42; 510/108; 510/180; 510/191; 510/203; 510/214; 510/238; 510/280; 510/365; 510/383; 510/417; 510/426; 510/428

[58] Field of Search ..... 510/372, 370, 510/108, 180, 191, 203, 214, 238, 280, 365, 375, 383, 417, 426, 428; 8/111, 137; 134/2, 40, 42

[56] References Cited

U.S. PATENT DOCUMENTS

| | | | |
|---|---|---|---|
| 4,230,478 | 10/1980 | Zumbrunn | 71/21 |
| 4,430,236 | 2/1984 | Franks | 252/186.41 |
| 4,530,781 | 7/1985 | Gipp | 510/284 |
| 4,704,225 | 11/1987 | Stouffer | 134/40 |
| 4,711,739 | 12/1987 | Kandathil | 510/284 |
| 4,749,516 | 6/1988 | Brusky | 510/284 |
| 4,829,897 | 5/1989 | Wyman et al. | 510/170 |
| 5,008,030 | 4/1991 | Cook et al. | 510/384 |
| 5,281,280 | 1/1994 | Lisowski et al. | 510/199 |
| 5,376,297 | 12/1994 | Choy et al. | 510/418 |
| 5,399,282 | 3/1995 | Hansen et al. | 510/400 |
| 5,527,486 | 6/1996 | De Guertechin | 510/365 |
| 5,531,938 | 7/1996 | Erilli | 510/417 |
| 5,549,840 | 8/1996 | Mondin et al. | 510/365 |
| 5,585,034 | 12/1996 | Lysy et al. | 510/403 |
| 5,597,788 | 1/1997 | Stevens | 510/212 |
| 5,643,861 | 7/1997 | De Guertechin et al. | 510/365 |

FOREIGN PATENT DOCUMENTS 0351772 1/1990 European Pat. Off. .

*Primary Examiner*—Lorna M. Douyon
*Attorney, Agent, or Firm*—Knechtel, Demeur & Samlan

[57] ABSTRACT

A cleaning composition including a terpene such as D-limonene and hydrogen peroxide in a surfactants based aqueous solution. The composition in various specific formulations is a micro-emulsion useful for a variety of materials and for both industrial and household applications.

4 Claims, No Drawings

SURFACTANTS BASED AQUEOUS COMPOSITIONS WITH D-LIMONENE AND HYDROGEN PEROXIDE AND METHODS USING THE SAME

Matter enclosed in heavy brackets [ ] appears in the original patent but forms no part of this reissue specification; matter printed in italics indicates the additions made by reissue.

BACKGROUND OF THE INVENTION

This invention relates to improved cleaning compositions and methods of using the same. More specifically, it relates to aqueous compositions which are surfactants based and include D-limonene and hydrogen peroxide.

Many different cleaning compositions have been developed for a variety of purposes. The art is replete with patents on such compositions. Depending on the specific materials to be cleaned and the uses of those materials, different results may be more or less important. An important goal for almost all such compositions is chemical stability for long periods of time over a broad temperature range.

Other goals which may be of greater or lesser importance depending on the application include action to remove grease and/or particulate soil, to deodorize, to disinfect, to remove stains, to remove mildew, to bleach, and to preserve color of the material being cleaned.

Another desirable characteristic is the capability of use for industrial or commercial purposes or in the home. In industry, such compositions are commonly purchased in concentrated form and diluted by the user, thus saving on shipping, packaging and storage expenses. In the home or small establishments, the convenience of a ready to use product is desirable.

Applicants' invention contains no materials which were not heretofore known in the art of cleaning compositions. However, their invention relates to new and unobvious combinations of such materials, which in use provide superior results to those provided by the prior art.

Of the many patents in the art, Applicants believe the following are the ones of most interest:

U.S. Pat. No. 4,430,236 discloses an aqueous product containing hydrogen peroxide, a nonionic surfactant or a mixture of a nonionic surfactant and an anionic surfactant. Many other patents show the use of hydrogen peroxide.

U.S. Pat. No. 5,281,280 discloses a mildew remover containing hypochlorite, bicarbonate and D-limonene. Many other patents exist showing the use of D-limonene, which provides a pleasant citrus-like aroma, as well as cleaning properties.

It appears to be significant that Applicants have found no disclosures of the use of both hydrogen peroxide and a terpene such as D-limonene together. It is believed that this is because conventional wisdom would suggest that such a mixture would be unstable as would most mixtures including hydrogen peroxide because of its reactivity.

SUMMARY OF THE INVENTION

Accordingly, it is an object of the invention to provide cleaning compositions which include both hydrogen peroxide and a terpene such as D-limonene and methods of using the same.

Another object of the invention is to provide cleaning compositions with high stability for long periods of time under a broad range of temperatures.

Still another object of the invention is to provide cleaning compositions which may be prepared in diluted ready to use form or in concentrated form for industrial use.

Yet another object of the invention is to provide improved cleaning compositions with selectable multiple purposes, including degreasing, particulate soil removal, deodorizing, disinfecting, stain removal, mildew removal, bleaching and color preservation for hard, resilient and porous surfaces and fiber products.

These and other objects of the invention are provided by the invention, as described in the following detailed description.

DETAILED DESCRIPTION OF THE INVENTION

Most generally the improved compositions all include a terpene, an anti-oxidant to stabilize the terpene, two anionic surfactants, a nonionic surfactant, and hydrogen peroxide, all in a deionized water solution.

The terpene is a terpene hydrocarbon and may be a monoterpene or a sesquiterpene, or a mixture of both. The terpene may be acyclic, monocyclic or bicyclic, with monocyclic or bicyclic terpenes being preferred. The preferred specific terpene is D-limonene, a biodegradable product derived from orange rind oil.

The terpene is stabilized with a food grade anti-oxidant, e.g., a butylated hydroxy anisole blend with other materials.

One of the anionic surfactants is preferably the isopropylamine salt of linear alkylbenzene sulfonic acid. It is an excellent cleaning surfactant and an effective emulsifier for D-limonene and other terpenes to form an oil-in-water solution. It is very biodegradable because of its linear alkyl group. It greatly facilitates the formulation of a dilutable micro-emulsion concentrate. One commercial name for this is Biosoft N-411.

An anionic surfactant which is preferred for the second surfactant is sodium 1-octane sulfonate. It has excellent coupling properties, is an effective wetting agent, surface tension reducer and hydrotrope. It is stable over a wide pH range, has good compatibility with various conventional detergent builders or additives and stability with respect to hydrogen peroxide. A commercial name for this surfactant is Bioterge PAS-8S.

The nonionic surfactant is preferably an alkyl ethoxylate having 12 to 15 carbon atoms. It is the condensation product of an aliphatic alcohol with about 65.6% weight basis etylene oxide. It is highly water soluble and has a hydrophile-lipophile (HLB) of 13.1:1. It is available under the commercial name of Neodol 25-9.

Hydrogen peroxide ($H_2O_2$) is an important part of the compositions because it greatly improves the cleaning, deodorizing and disinfecting performance by its addition. It is conveniently supplied in a concentration of 35% by weight in an aqueous solution. Applicants' experiments have shown that this solution remains stable when combined with the other ingredients in a micro-emulsion when the solution is over half of the micro-emulsion.

The present maximum allowable actual concentration of hydrogen peroxide in a product to avoid health and environmental hazards is 7.9%. Using a 35% aqueous solution, this translates to a maximum percentage of 22.8% of the peroxide solution in the composition in its concentrated forms. In view of the reactivity of hydrogen peroxide and expected greater reactivity when combined with terpenes, it would have been expected that even such a lower concentration would be unstable, but such is not the case. In fact, all formulations are stable for long periods of time and over a broad temperature range, including both those compositions containing a higher hydrogen peroxide percentage than 7.9%.

Applicants' invention is not limited by any theory expressed herein. However, it is presently believed that these results may come from both the second anionic surfactant and the use of the final ingredient, deionized water. If the water were not deionized, divalent metals could be present and react with the hydrogen peroxide.

Stability may be further improved by the addition of other ingredients, such as chelating agents. One of the these could be sodium ethylene diaminetetraacetate.

An advantage of all the compositions is that they are clear micro-emulsions. Thus during application to surfaces or materials, the surfaces can be seen by the users and the progress can be observed.

Generally, the actual concentration of hydrogen peroxide is varied downward from the 7.9% level discussed above depending on the risk of contact with human skin in actual use. The highest concentrations may be used in commercial or industrial use where the compositions are sold in bulk quantities and are to be diluted just before use. In compositions sold for use in the household, dilution is not expected, so the hydrogen peroxide level is the lowest. Other variations will be based on the materials to be cleaned and the specific purposes. None of the compositions are intended for use as body cleaners.

Table 1 sets forth formulations for five compositions within the scope of the invention, with Product Numbers 110, 120, 140, 141 and 142. All of the ingredients of Products 110 and 120 have been disclosed above. Product 110 is a multi-purpose product with high percentages of active ingredients. It is intended for dilution just before use and is sold to commercial and industrial users. Product 120 is much less concentrated and is sold in ready to use form as a household all purpose cleaner.

Product 140 is another formulation for industrial or commercial use with appropriate high concentration. This product (as well as Products 141 and 142) includes an additional water soluble co-solvent, namely a glycol ether. A preferred co-solvent is ethylene glycol monobutyl ether because it is effective in removing organic or petroleum soils due to its ether linkage. This is commercially available under the name Glycol EB. Hence, these three products all are superior when such soils are part of the problem.

Product 141 and Product 142 both additionally include a thickening agent, a modified polyacrylate-polyalcohol polymer commercially available under the name Thix. The increased viscosity and the other variations in percentages make Product 141 more useful as a carpet spotter because it safeguards the color of the carpet and eliminates odors. Product 142 has an increase in hydrogen peroxide and a decrease in deionized water relative to Product 141. It is preferred for more stringent fiber cleaning and greater deodorization, for example when pet soil is a problem. Both Products 141 and 142 are intended for undiluted household use.

TABLE 1

| Ingredient | 110 | 120 | 140 | 141 | 142 |
|---|---|---|---|---|---|
| D-limomene | 7.08% | 1.32% | 6.58% | 0.55% | 0.55% |
| Anti-oxidant | 0.02% | 0.02% | 0.02% | 0.02% | 0.02% |
| Glycol EB | 0.00% | 0.00% | 7.00% | 0.58% | 0.58% |
| Biosoft N-411 | 8.55% | 1.60% | 7.95% | 0.66% | 0.66% |
| Neodol 25-9 | 6.41% | 1.20% | 5.96% | 0.50% | 0.50% |
| Bioterge PAS-8S | 5.74% | 1.07% | 5.34% | 0.44% | 0.44% |
| Di Water | 49.61% | 92.01% | 44.51% | 93.41% | 92.21% |
| $H_2O_2$ (35%) | 22.60% | 2.80% | 22.60% | 2.80% | 4.00% |
| Thix | 0.00% | 0.00% | 0.00% | 1.00% | 1.00% |
| Total | 100.00% | 100.00% | 100.00% | 100.00% | 100.00% |

Description of Ingredients for the Above Formulation Table

| | |
|---|---|
| D-limosene | A terpene derived from distilled orange rind oil. |
| Anti-oxidant | A butylated hydroxy anisole blend. |
| Glycol EB | Ethylene glycol monobutyl ether. |
| Biosoft N-411 | Isopropylamine salt of linear alkylbenzene sulfonic acid (Amionic surfactant) |
| Neodol 25-9 | An alkyl ethoxylate having 12 to 15 carbon atoms. (Nonionic surfactant) |
| Bioterge PAS-8S | Sodium 1-octane sulfonate. (Amionic surfacant) |
| Di Water | Deionized water. |
| $H_2O_2$ (35%) | Hydrogen peroxide bleach 35% weight solution in water. |
| Thix | A modified polyacrylate-polyalcohol polymer. (Thickening agent) |

Table 2 discloses seven broad uses of Applicants' compositions with numerous specific uses comprised therein. The first column states the uses. The second column references the five formulations disclosed in Table 1. The third column states the desired dilution, if any, before use. The fourth column states the remaining steps of the method of use.

TABLE 2

| | APPLICABLE FORMULA | WATER TO FORMULA RATIO | METHOD |
|---|---|---|---|
| FOR USE AS A MULTI-PURPOSE CLEANER. Formulations may be balanced to provide a broad range of cleaning effectiveness without possbility of damage to any water-safe surface or fiber. Each specific application's cleaning needs are effectively satisfied by varying the water to cleaner ratio at the work site. Applications effectively satisfied by one formula are: | 110 (commercial)<br>120 (household)<br>140 (commercial) | 20:1 to 1000:1<br>0:1 to 100:1<br>20:1 to 1000:1 | Commercial products 110 and 140 are diluted in the filed by means of ventri eductor driven with water pressure to provide multiple levels of water dilution, automatically to satisfy a broad range of cleaning needs.<br>1. 20:1 Degreasing solution for kitchens and mechanical Working areas. |

TABLE 2-continued

| | APPLICABLE FORMULA | WATER TO FORMULA RATIO | METHOD |
|---|---|---|---|
| 1. Cleaning Hard & resilient surfaces<br>2. Cleaning Glass & mirrors<br>3. Cleaning & disinfecting Bathroom urinals commodes, sinks & fixtures<br>4. Cleaning & removing spots from Fibers ... ie. Carpet, upholstery, Fabrics | | | 2. 54:1 A Pre-spray and soak method is used for heavily Soiled floors or walls, carpets, bathroom urinals, commodes, sinks, fixtures and walls, stalls and floors adjacent to those areas.<br>3. 256:1 No rinse wipe down cleaner and bathroom floor moping solution.<br>4. 512:1 General mop bucket and mechanical scrubbing equipment solution.<br>Glass and mirror cleaner.<br>5. 1000:1 Mechanical scrubbing machine solution for high gloss floors. |
| FOR USE IN ELIMINATION OF ODORS.<br>These formulation are particularly effective for soluablizing soils and oxidizing odors associated with urine, feces, decomposing food, smoke and mildew. | 110 (commercial)<br>120 (household)<br>140 (commercial)<br>141 (household)<br>142 (household) | 10:1 to 54:1<br>0:1 to 10:1<br>10:1 to 54:1<br>0:1<br>0:1 | The affected area is sprayed wtth the appropriate dilution and allowed to soak for three to fifteen minutes depending on the severity, type of soil and surface. The affected surface is then scrubbed and rinsed with water to remove soils and residual cleaner. |
| FOR USE AS A DISINFECTANT.<br>These formulations demonstrate effective bacteria destruction properties for Gram Positive an Gram Negative Bacteria as well as Yeast and Mold. | 110 (commercial)<br>120 (household)<br>140 (commercial)<br>141 (household)<br>142 (household) | 10:1 to 54:1<br>0:1<br>10:1 to 54:1<br>0:1<br>0:1 | The affected area is sprayed with the appropriate dilution (lower water dilutions result in stronger disinfectant properties). The affected area is allowed to soak for two to ten minutes depending on the dilution ratio (lower water dilutions work faster). The affected area is then scrubbed or wiped and or rinsed with water (higher water dilutions do not require rinsing). |
| FOR USE ON HARD & RESILIENT SURFACES. These formulations are effective cleaning agents for hard or resilient surfaces at high water dilution ratios. Products using this technology provide penetrating solvency for porous surfaces. Bleaching action is surface-safe and particularly effective on grouted ceramic tile. | 110 (commercial)<br>120 (household)<br>140 (commercial)<br>141 (household)<br>142 (household) | 20:1 to 1000:1<br>0:1 to 100:1<br>0:1 to 1000:1<br>0:q<br>0:1 | The surface is cleaned by mop or mechanical scrubbing machines at approriate dilution levels. For heavy soils the lower dilutions are pre-sprayed on the surface and allowed to soak for three to fifteen minutes and then scubbed and rinsed with water. |

Various changes and modifications will be apparent to those skilled in the art. All of these are to be included within the scope of the appended claims.

What is claimed is:

1. A clear stable liquid micro-emulsion cleanser composition comprising:

a. from about 0.5% to 10% *by weight* of a terpene *solvent* selected from [mono- and] *the group consisting of* sesquiterpenes and mixtures thereof;

b. from about 0.5% to about 10% *by weight* of a water soluble glycol ether solvent;

c. from about 0.5% to about 10% *by weight* of an isopropylamine salt of linear alkyl benzene sulfonic acid as a first anionic surfactant;

d. from about 0.4% to about 10% *by weight* of a sodium 1-octane sulfonate as a second anionic surfactant to provide coupling and stability effects;

e. from about 0.5% to about 10% *by weight* of an alkyl ethoxylate nonionic surfactant with an HLB of 11 to 15 to approximate the HLB of the terpene solvent;

f. from about 2.0% to about 22.8% by weight of a 35% by weight aqueous solution of hydrogen peroxide;

g. from about 0.2% to 4% by weight of a food grade anti-oxidant based on the terpene weight percentage to stabilize the terpene;

h. from about 1.0% to 5.0% by weight of a polyacrylate-polyalcohol polymer used as a thickening agent; and i. deionized water.

2. A [cleaning] *clear stable liquid micro-emulsion cleanser* composition according to claim 1 wherein said terpene solvent is D-limonene.

3. A method of using the micro-emulsion of claim 1 comprising a. applying said micro-emulsion to a material to be cleaned whereby said micro-emulsion incorporates soil from said material; and b. removing said micro-emulsion from said material.

4. A method according to claim 3 including diluting one part of said micro-emulsion with up to 1000 parts of water prior to applying said micro-emulsion.

* * * * *